Oct. 24, 1950     T. T. WOODSON     2,527,238
CLUTCH STRUCTURE FOR SPINNER TYPE WASHING MACHINES
Filed Aug. 25, 1944     6 Sheets-Sheet 1

Inventor:
Thomas T. Woodson,
by Harry E. Dunham
His Attorney.

Oct. 24, 1950 T. T. WOODSON 2,527,238
CLUTCH STRUCTURE FOR SPINNER TYPE WASHING MACHINES
Filed Aug. 25, 1944 6 Sheets-Sheet 2
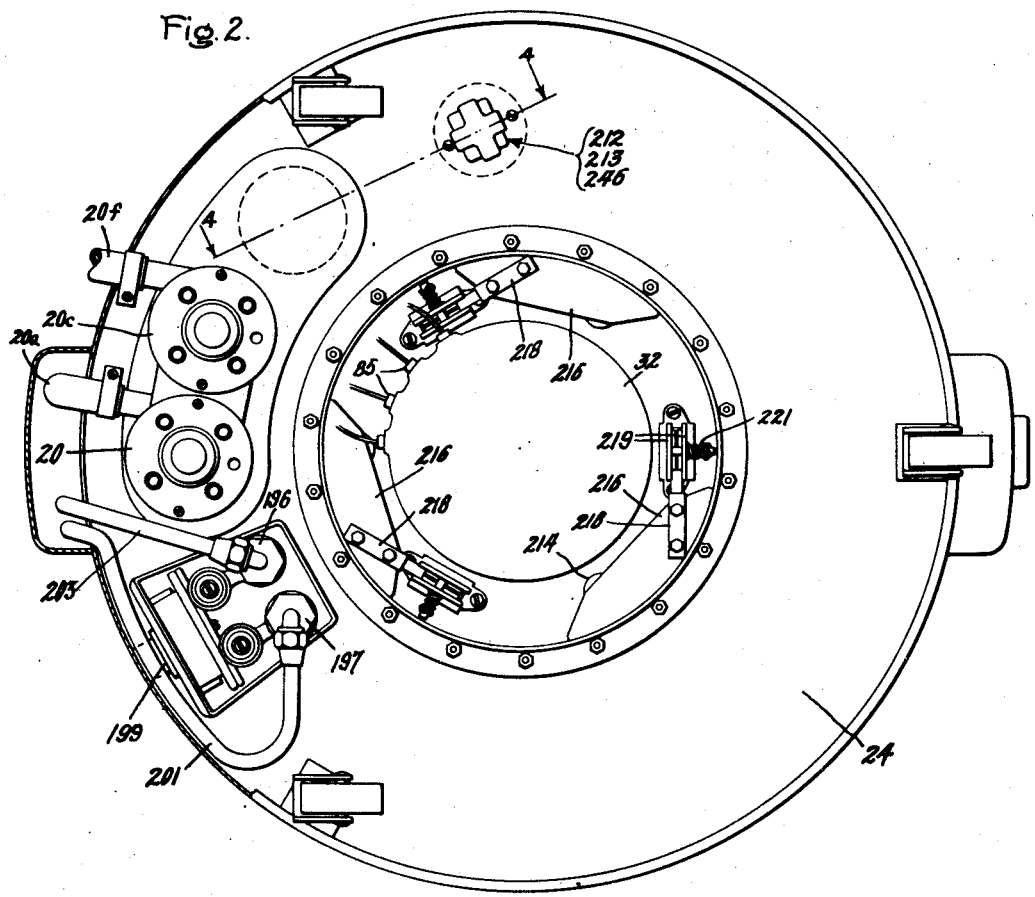
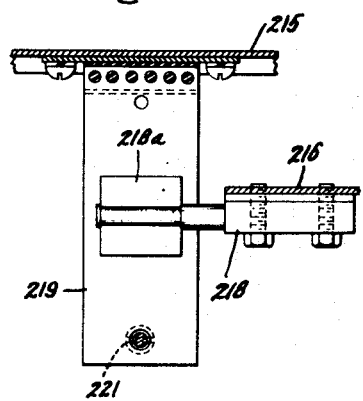
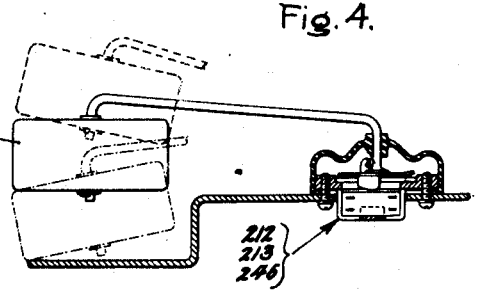
Inventor:
Thomas T. Woodson,
by Harry E. Dunham
His Attorney.

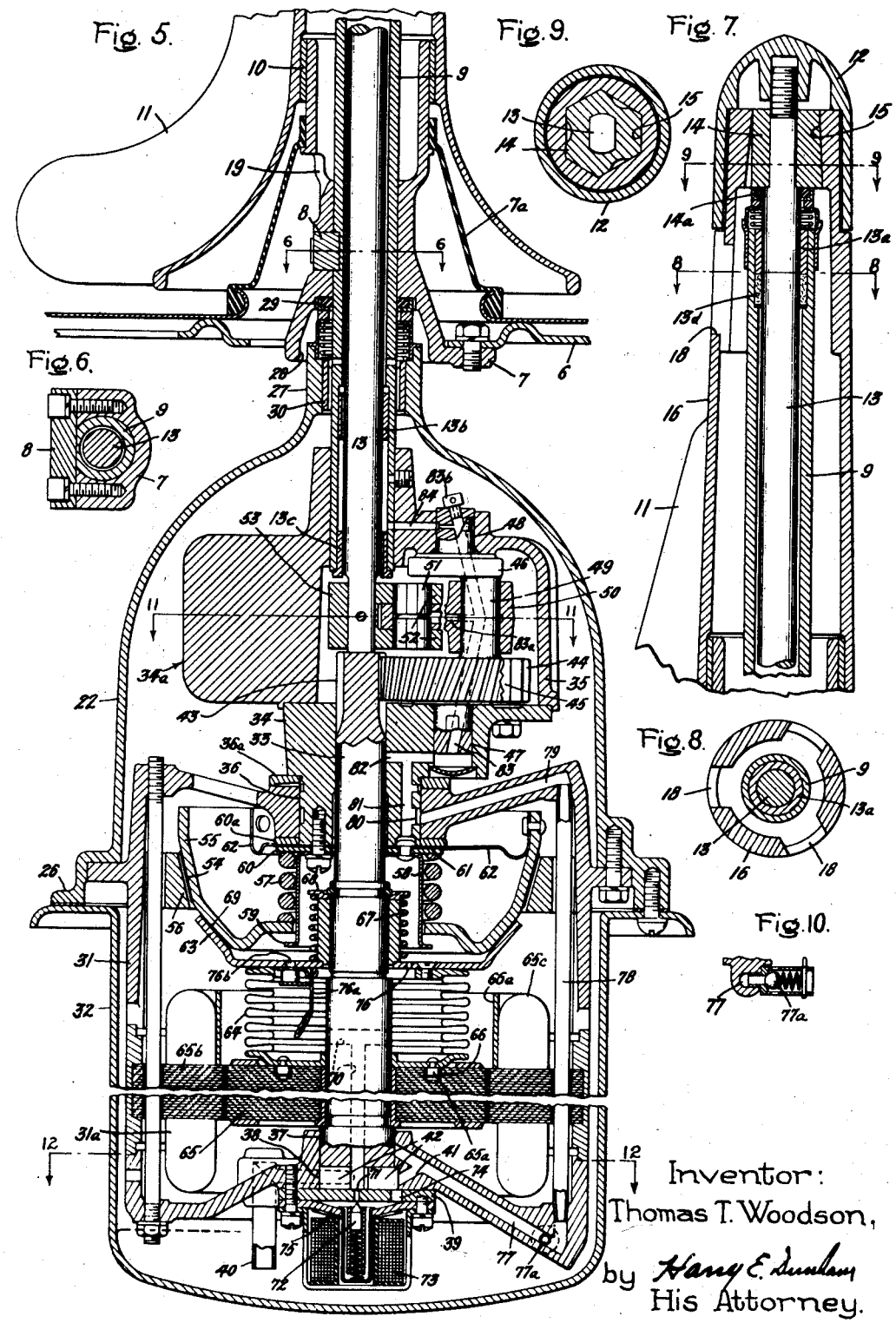

Oct. 24, 1950 T. T. WOODSON 2,527,238
CLUTCH STRUCTURE FOR SPINNER TYPE WASHING MACHINES
Filed Aug. 25, 1944 6 Sheets-Sheet 4

Inventor:
Thomas T. Woodson,
by Harry E. Dunlavy
His Attorney.

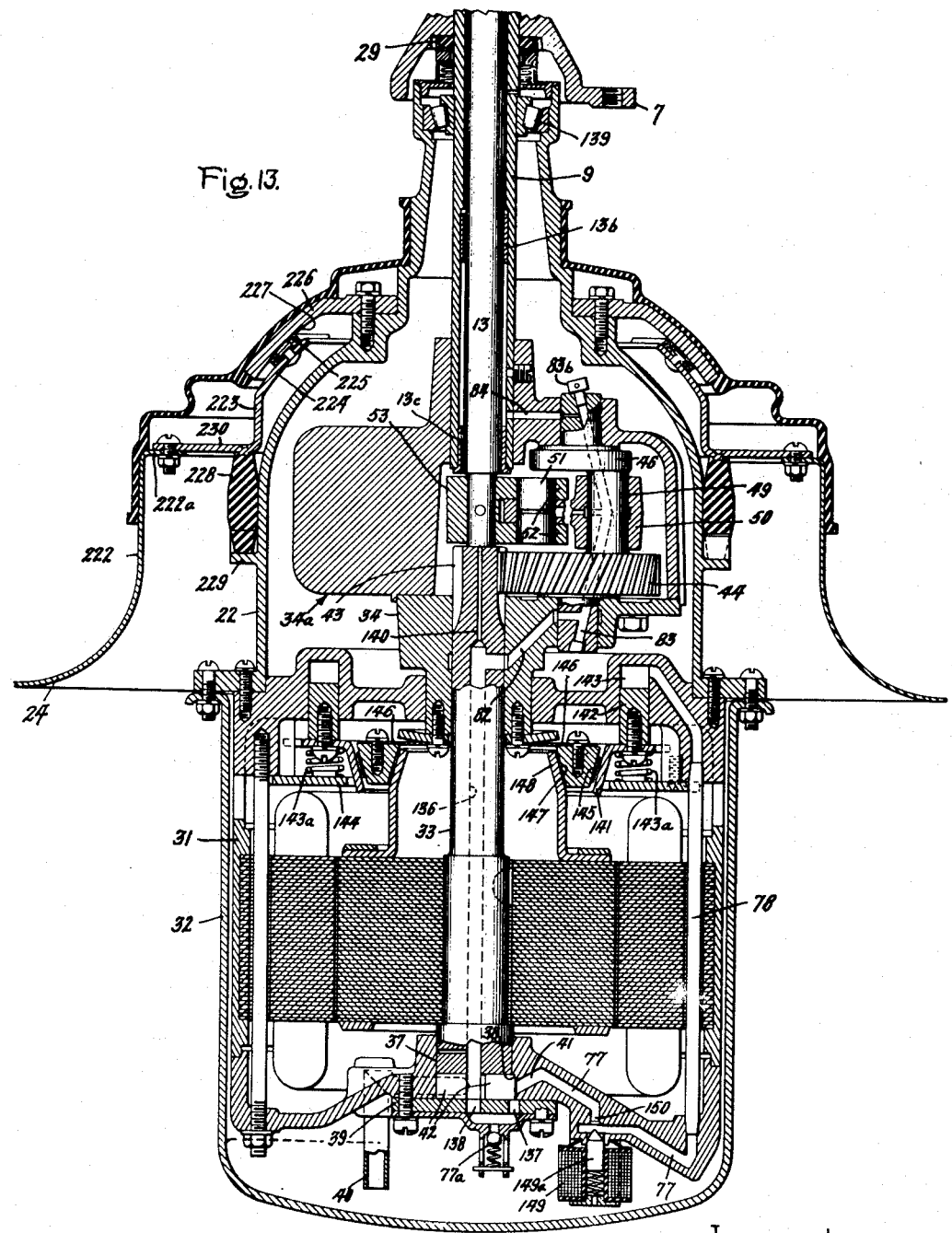

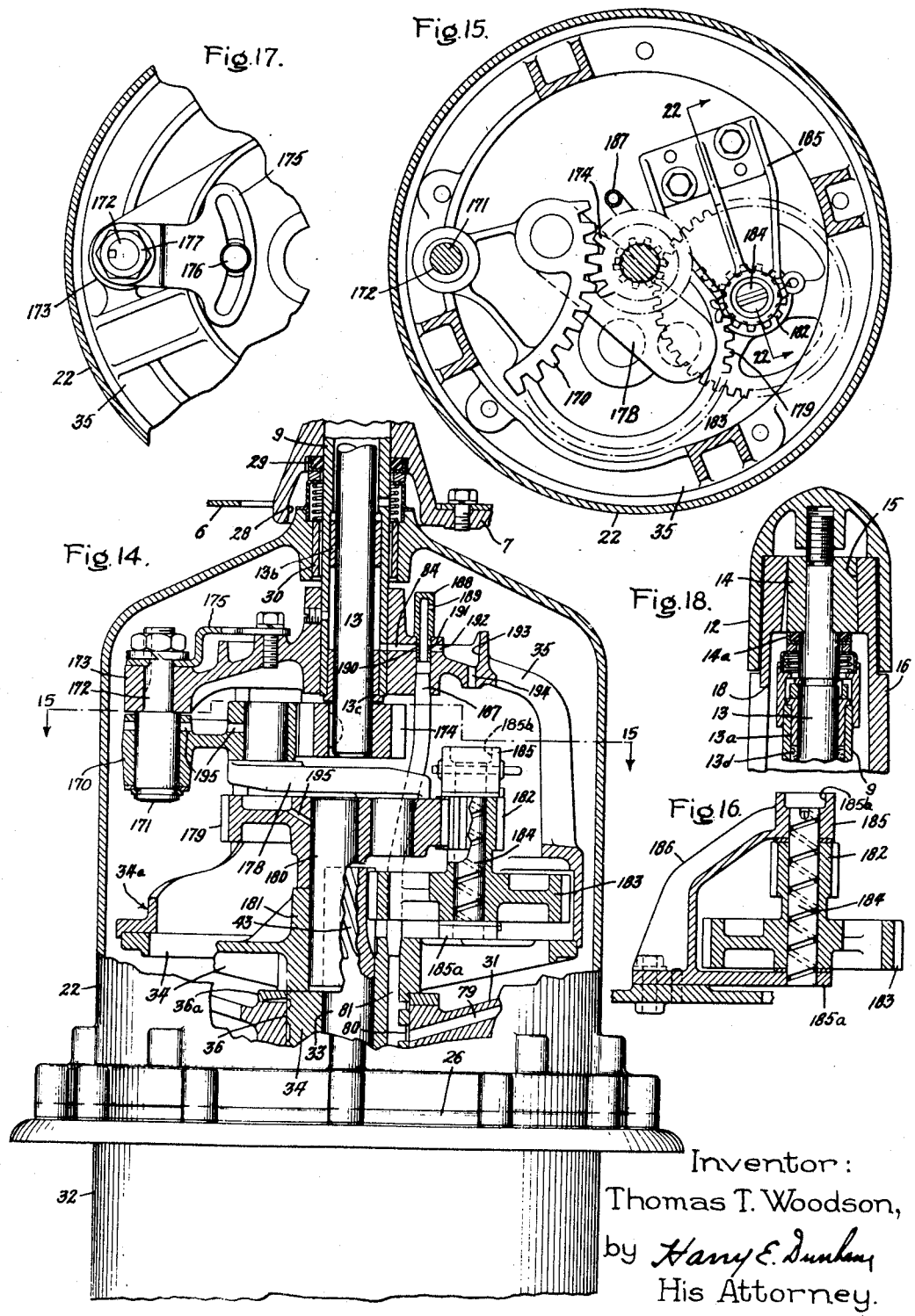

Patented Oct. 24, 1950

2,527,238

UNITED STATES PATENT OFFICE 2,527,238

CLUTCH STRUCTURE FOR SPINNER TYPE WASHING MACHINES

Thomas T. Woodson, Fairfield, Conn., assignor to General Electric Company, a corporation of New York Application August 25, 1944, Serial No. 551,096

5 Claims. (Cl. 192—3.5)

1

The present invention relates to washing and drying machines and is particularly concerned with hydraulically controlled driving mechanism in which the motor, mechanism, and control may be enclosed within a sealed casing.

The object of my invention is to provide an improved construction and arrangement in washing machines of this type, and for a consideration of what I believe novel and my invention, attention is directed to the following description and the claims appended thereto.

Figure 1:
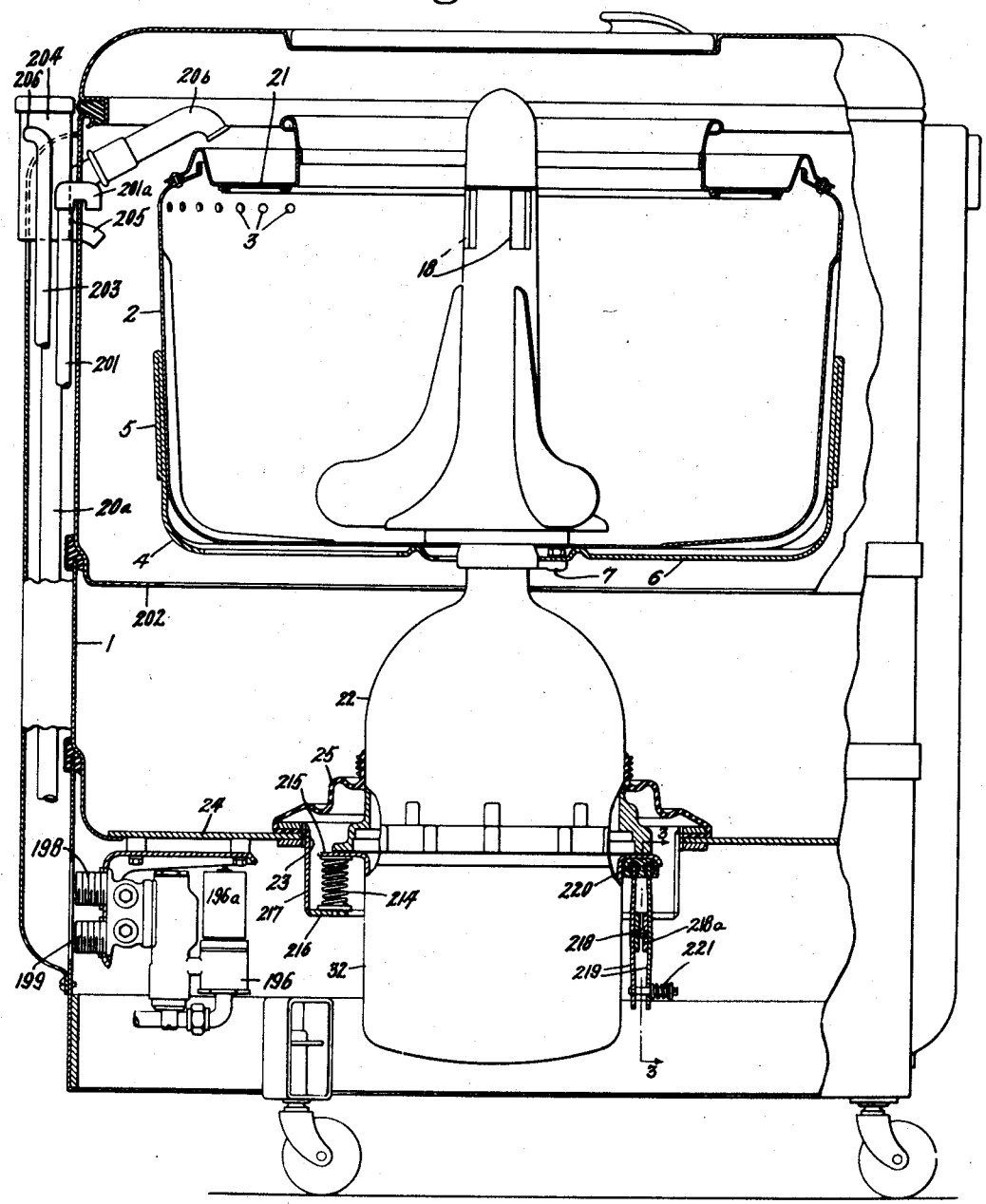
Figure 11:
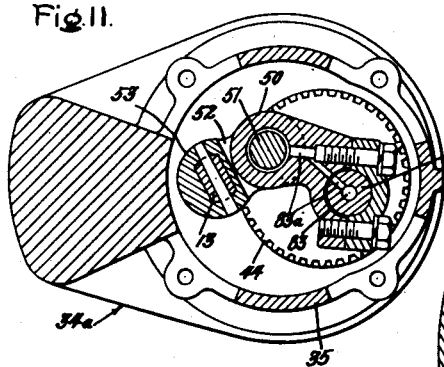
Figure 12:
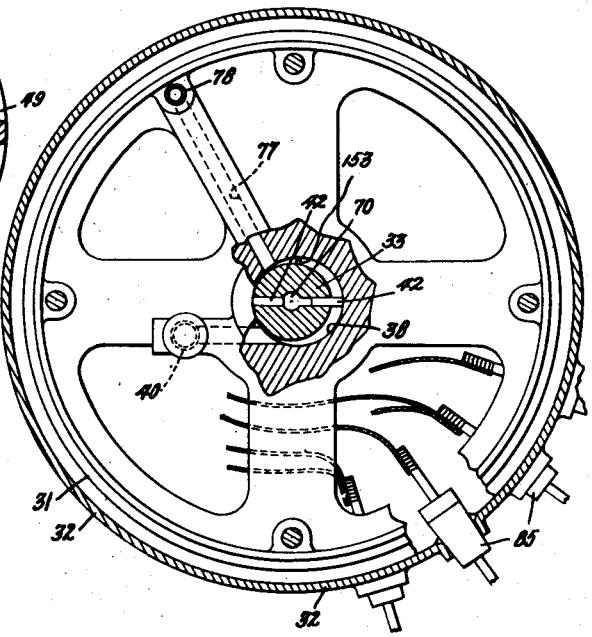

In the accompanying drawing, Fig. 1 is a sectional elevation of a washing machine embodying my invention; Fig. 2 is a bottom plan view; Fig. 3 is a section on line 3—3 of Fig. 1; Fig. 4 is a detail of the float controlling the liquid supply; Fig. 5 is an enlarged sectional elevation of one form of the driving mechanism; Fig. 6 is a sectional view on line 6—6 of Fig. 5; Fig. 7 is an enlarged view of the upper end of the agitator; Fig. 8 is a section taken on line 8—8 of Fig. 7; Fig. 9 is a section taken on line 9—9 of Fig. 7; Fig. 10 is a detail of the pressure relief valve in the oil line; Fig. 11 is a section on line 11—11 of Fig. 5; Fig. 12 is a section on line 12—12 of Fig. 5; Fig. 13 is another modification of the driving mechanism; Fig. 14 is a modification of the agitator driving gearing for slow speed agitator oscillation; Fig. 15 is a section on line 15—15 of Fig. 14; Fig. 16 is a section on line 16—16 of Fig. 14; Fig. 17 is a detail of the adjustment of the oscillating sector gear; Fig. 18 is a detail of the upper end of the slow speed agitator.

Referring to Fig. 1 of the drawing, there is shown a washing machine having an outer casing or tub 1 in the upper part of which is located a spinner basket 2 having centrifugal discharge openings 3 at the region of greatest diameter which during washing are at or slightly above the liquid level. The spinner basket is non-rotatably seated in a carrier 4 having annular walls 5 surrounding the basket and serving as a balance ring and having radial arms 6 bolted to a hub 7 (Fig. 5) fixed by a clamp 8 (Fig. 6) to a tubular shaft 9 for supporting and driving the spinner basket. The space between the basket and the hub is sealed by a rubber sleeve 7a (Fig. 5) having its upper end fixed to the hub and its lower end fixed to the basket. At the upper end of the hub is a bearing 10 (Fig. 5) for the lower end of a bladed agitator 11 fastened by a nut 12 (Fig. 7) to the upper end of a drive shaft 13 journaled in bearings 13a, 13b, and 13c in the spinner shaft 9. An oil retain-

2 ing felt ring 13d is associated with the bearing 13a. The shaft 13 has fixed thereto an agitator drive nut 14 fitting in a complementary socket 15 in the agitator hub. A shaft seal 14a is provided between the upper ends of the spinner and agitator shafts 9 and 13.

In the agitator hub 16 at or slightly below the wash water level in the spinner basket are drain passages 18 leading to the space between the spinner shaft 9 and the agitator hub 16. The water draining through these passages flows through the space between the shaft 9 and the agitator hub and through passages 19 in the carrier hub 7 to the bottom of the outer casing 1 whence it is pumped onto an annular filter 21 (Fig. 1) on the rim of the spinner basket by a circulating pump 20 (Fig. 2). The pump has its inlet (not shown) connected to the lowermost part of the casing and its discharge connected to a conduit 20a having a nozzle 20b directed onto the filter. The pump is operated during washing so the wash water is continually withdrawn from the spinner basket through the passages 18 and 19 (and possibly openings 3) and returned to the basket through the filter 21. The continuous circulation and filtering of the water removes lint and other particles and keeps the wash water clean. The amount of wash water flowing through the passages 18 and 19 automatically adjusts itself to the capacity of the pump 20 by slight variation of the wash water level. If the pump flow should become restricted, the wash water level would fall only slightly below the lower edges of the openings 18 which is only slightly less than the desired water level for washing.

There is also provided a drain pump 20c having its inlet (not shown) connected to the lowermost part of the outer casing 1 and its discharge connected to a conduit 20f leading to a drain above tub water level. The pumps 20, 20c are driven by suitable separate electric motors, not shown.

The concentric spinner and agitator drive shafts 9 and 13 are driven by mechanism enclosed within a sealed casing 22 (Fig. 1) having its upper end projecting through openings 23 in the bottom plate 24 of the outer casing. The space between the casing 22 and the plate 24 is sealed by a flexible annular rubber ring 25 having its inner edge clamped to the casing 22 and its outer edge clamped to the plate 24. The ring 25 is flexible to prevent the transmission of vibration to the outer casing. The upper end of the casing 22, which is above the maximum water level in the outer casing 1, is provided with a reduced hub 27 (Fig. 5) which projects within a skirt 28 at the lower end of the hub 7 and is provided with a seal 29 and a sleeve bearing 30 for the spinner shaft 9. During both washing and centrifugal drying the upper part of the gear casing 22 is cooled by the wash water. During washing, the wash water falls onto the upper end of the gear casing from the passages 19. During centrifugal drying, the wash water discharged through the centrifugal discharge openings 3 falls into the bottom of the outer casing and partially submerges the upper end of the gear casing.

The driving motor 31a for the machine is carried in a frame 31 bolted to the under side of a flange 26 at the lower edge of the gear casing 22 and enclosed by a shell 32 (also bolted to the flange 26) which forms the motor cover. The motor shaft 33 is journaled at its upper end in the lower half 34 of a rotatable frame 34a. The lower half 34 of the frame is journaled in a bearing 36 in the motor frame 31 and the upper half 35 being fixed to the spinner shaft 9. The weight of the spinner basket and contents and of the frame 34a is carried on a thrust washer 36a at the upper end of the bearing 36. The lower end of the motor shaft 33 is journaled in a bearing 37 in the frame 31. The lower end of the bearing 37 is provided with an eccentric bore 38 closed by a plate 39 and forming the housing of a vane type rotary oil pump. The oil pump housing is connected with a sump at the bottom of the shell 32 by a suction intake 40 and is provided with a pressure discharge passage 41. The rotor of the pump consists of the extreme lower end of the motor shaft 33 which is slotted to receive vanes 42 (Fig. 12) which are held by centrifugal force against the bore 38. Integral with the upper end of the motor shaft 33 is a pinion 43 meshing with a gear 44 shrunk on a hub 45 of a crank shaft 46 journaled in bearings 47 and 48 in the lower and upper parts 34, 35 of the rotatable frame 34a. The crank arm 49 of the crank shaft is connected by a connecting rod 50 to a pin 51 fixed between the forked ends 52 of an arm 53 pinned on the lower end of the agitator shaft 13.

During washing, the frame 34a is held stationary by a conical brake surface 54 on a cup-shaped member 55 surrounding the motor shaft, which surface 54 is urged against a complementary brake surface 56 on the motor frame 31 by a coil spring 57 surrounding a cup 58 bolted to the lower frame member 34. The member 55 loosely surrounds the cup 58 so as to permit alignment of the brake surfaces 54 and 56, and the axial movement thereof is limited by a flange 59 on the cup 58. The lower end of the spring 57 is seated on the bottom of the member 55 and the upper end of the spring is seated on a thrust washer 60 clamped between the cup 58 and the lower frame member 34. The thrust is transmitted to the frame 31 through a thrust washer 60a at the lower end of the bearing 36. The braking or accelerating torque is transmitted through a structure comprising a hub 61 riveted to the washer 60 and the cup 58 and having curved axially flexible radially extending spring arms 62 fixed to the member 55. When the brake surfaces are in engagement, the frame 34a (and the spinner basket 2 which is fixed thereto) is brought to rest and the relative rotation of the motor shaft 33 with respect to the frame 34a causes oscillation of the agitator at a speed of the order of 350 oscillations per minute and through an arc of the order of 60 degrees in the present construction where the motor is a 6-pole induction motor having a full load speed of about 1150 R. P. M. The speed and stroke of the agitator obviously depend upon the motor speed and the oscillating mechanism carried in the frame.

During centrifugal drying, the spinner basket 2 is clutched directly to the motor shaft 33 by a conical clutch member 63 slidably surrounding the motor shaft and fixed to the upper end of a bellows 64 surrounding the motor shaft and keyed to the rotor 65 of the motor 31a by projections 65a on the bellows fitting in sockets 66 in the rotor. The bellows is biased to the collapsed position by a coil spring 67 arranged between the clutch member 63 and a washer 68 on the motor shaft.

The bellows is extended to move the clutch member 63 against a complementary clutch surface 69 on the member 55 (and to lift the member 55 clear of the brake surface 56) by oil pressure admitted through passages 70 in the motor shaft and through a port 71 in the plate 39. The port 71 is normally closed by a spring biased plunger 72 of a solenoid valve 73 mounted on the under side of the plate 39. Oil from the pump discharge 41 is conducted through a port 74 in the plate 39 to a chamber formed between a dished member 75 and the under side of the plate 39.

When the solenoid valve is energized, the plunger 72 is moved downward, opening the port 71 and admitting oil under pressure through the passages 70 to the interior of the bellows and raising the clutch member 63 into engagement with the clutch surface 69 (disengaging brake surfaces 54 and 56) and establishing a friction drive from the motor through the spring arms 62 and the frame 34a to the spinner basket. While the spinner basket is being accelerated the clutch surfaces slip and there is relative rotation between the motor shaft 33 and the frame 34a which causes oscillation of the agitator at a decreasing rate as the spinner basket approaches the motor shaft speed. As the clutch slippage approaches zero, the coefficient of friction increases and the clutch surfaces lock, placing a transient load on the motor which slightly lessens the motor speed. Thereafter the spinner basket runs at motor shaft speed which increases to the point on the motor speed torque curve at which the friction and windage load equals the motor power. Throughout centrifugal drying, oil is supplied to the bellows and leaks from bleeder openings 76. When the solenoid valve is deenergized, the oil supply to the bellows is cut off by the closing of the port 71 and the bellows returns to the collapsed position in which the brake surfaces are engaged and the clutch surfaces are disengaged. To prevent expansion of the bellows until the motor is up to speed, a centrifugal valve 76a is provided which is moved outward by centrifugal force to close a bleeder opening 76b large enough to prevent the building-up of a bellows operating pressure until the motor is up to speed. The valve is gravity-biased to the open position.

In addition to supplying the hydraulic control for the washing and drying operations, the oil pressure is used to pressure lubricate the bearings and the oil from the bearings heated by friction losses in the mechanism and by the losses in the motor is thrown from the bearings over the inside of the casing for cooling purposes. The lower shaft bearing 37 is fed from one end of a passage 77, the other end of which is connected through passages 78 and 79 to the bearings 36, 36a for the lower frame member 34. A pressure relief valve 77a (Fig. 10) may be used if desired to limit the oil pressure. Leading from an annular groove 80 in the frame member 34 is a vertical passage 81 having its lower end closed and its upper end connected to a transverse passage 82 leading between the upper motor shaft bearing and the lower crank shaft bearing 47. Drilled passages 83 in the crank shaft feed the upper crank shaft bearing 48 and through branch passages 83a (Fig. 11) also feed the bearings at each end of the connecting rod 50. Oil for cooling purposes is sprayed from a fitting 83b at the upper end of the passage 83. Throughout the interior of the casing there is during rotation of the motor an oil mist which settles on the inner surface of the casing of the motor and other parts of the mechanism. The oil trickles through suitable drain passages (not shown in detail) to the bottom of the casing. Oil settling on the rotor 65 is thrown outward by centrifugal force so there is only an oil mist in the air gap of the motor. A dam 66a is provided on the stator 65b which holds oil in contact with the stator windings 65c which trickles through the stator winding slots (not shown). From the upper crank shaft bearing 48 a passage 84 conducts oil to the agitator shaft bearings 13a, 13b, 13c and to the spinner shaft bearing 30.

The mechanism is controlled through conductors leading through glass-to-metal seals 85 (Fig. 12) in the shell 32 leading to the motor and solenoid valve. Washing is started by closing the motor circuit. Centrifugal drying is started by closing the solenoid valve circuit in addition and is stopped by opening both the motor and solenoid valve circuits. Because the shift to centrifugal drying depends upon oil pressure, the motor must be up to speed before the mechanism can be shifted to centrifugal drying. This prevents heavy starting loads on the motor. Because the mechanism and control are sealed within this enclosing casing 22, 32, a lifetime supply of oil is sealed within the casing so that further attention is unnecessary.

The modification shown in Fig. 13 differs from the previously described constructions in the arrangement of the mechanism and control within the sealed casing 22, 32. The motor shaft 33 is drilled to provide an oil passage 136 which is fed from the discharge side of the pump 38—40 through ports 137, 138 in the plate 39. Through connecting passages, the oil supplied through the passage 136 pressure lubricates the bearings for the motor and mechanism. The mechanism is substantially identical with that shown in Fig. 5 except that the thrust washer 36a is replaced by a tapered roller thrust bearing 139 at the upper end of the casing and oil under pressure is supplied through a passage 140 to the lower end of the agitator shaft 13.

During washing, the rotation of the frame 34a is prevented by a conical brake member 141 fixed at its upper edge to an annular piston 142 in a cylinder 143 in the motor frame 31. The brake member is biased upward by coil springs 143a fixed between the brake member 141 and a ring 144 fixed to the motor frame. The brake member cooperates with a complementary annular brake surface 145 fixed to the outer ends of radial flat spring arms 146, the inner ends of which are bolted to the under side of the frame member 34. In the uppermost (braking) position, the brake member 141 lifts a conical clutch surface 147 clear of a complementary clutch 148 fixed to the motor. In the lowermost (clutching) position of the brake member 141, it is clear of the brake surface 145 and the clutch surface 147 is urged into contact with the motor clutch 148 by the spring arms 146 establishing a direct driving connection from the motor to the spinner basket.

The shift from washing to drying is controlled by a solenoid valve 149 having a plunger 149a which normally closes a valve port 150 in passage 77. When the valve 149 is deenergized, the port 150 is closed cutting off the oil pressure in the passages 77, 78 and the brake member 141 is accordingly raised by the springs 143a to the uppermost or braking position, the fluid in the cylinder escaping through suitable clearance between the piston and cylinder. When in raised position, the frame 34a is held against rotation by engagement of brake member 141 with brake surface 145, clutch surface 147 being separated from motor clutch 148 so the relative rotation of the motor shaft in the frame causes oscillation of the agitator for washing. When the valve 149 is energized, the plunger 149a opens the port 150 and the oil pressure admitted to the cylinder 143 moves the brake member 141 to the lowermost position and the clutch 147 is moved by the spring arm 146 into sliding engagement with the motor clutch surface 148 to establish a direct drive from the motor to the spinner basket. During rotation of the spinner basket, the agitator will be oscillated at a rate dependent upon the relative rotation of the motor shaft with respect to the frame 34a. Oscillations of the agitator cease when the spinner basket rotates at the motor shaft speed.

In Figs. 14–17 is shown a low speed agitator oscillating mechanism (approximately 180 degrees stroke 60 oscillations/minute) which can be substituted for the high speed oscillating mechanism (60 degree stroke 350 oscillations/minute) of Fig. 5. Corresponding parts are indicated by the same reference numerals.

As in the previously described constructions, the frame 34a which carries the agitator oscillating mechanism is made in two parts, the upper part 35 being fixed to the spinner shaft 9 and the lower part 34 being journaled in a sleeve and thrust bearing 36, 36a in the motor frame 31 pressure lubricated by oil from the passage 79. During washing the frame 34a is held stationary. During spinning the frame is clutched to the motor.

The agitator is oscillated by a sector gear 170 pivoted on a stub shaft 171 having a reduced portion 172 eccentric to the shaft (Fig. 15) mounted in a boss 173 on the upper frame member 35. The sector gear meshes with a pinion 174 keyed on the lower end of the agitator shaft 13. The mesh of the gears 170, 174 is adjusted by an adjusting arm 175 keyed to the reduced portion 172. By turning the arm 175, the gear 170 is moved toward or away from the pinion 174. When the proper mesh is secured, the arm 175 and the shaft 171 are locked in position by tightening nuts 176, 177. This adjustment will be made ordinarily when the machine is being assembled initially. The gear 170 is oscillated by a crank arm 178 connecting the gear 170 with a gear 179 journaled on a shaft 180 fixed in a boss 181 on the lower frame member 34. The gear 179 is driven by a pinion 182 (Fig. 16) integral with a gear 183 journaled on a shaft 184 fixed between arms 185 and 185a of a frame 186 bolted to the lower frame member 34. The gear 183 meshes with the pinion 43 on the motor shaft 33.

The lubrication is a combination of pressure and splash or drip. The lower sleeve and thrust bearings 36, 36a are pressure lubricated by oil from the passages 79, 80 and 81. The upper end of the oil passage 81 is connected by a tube 187 to a fitting 188 having a port 189 spraying oil against the inner surface of the casing 22 for cooling purposes, a port 190 feeding oil under pressure to the passage 84 for lubricating the agitator shaft bearings 13a, 13b, 13c, spinner shaft bearing 30 and a port 191 feeding oil through a passage 192 to a trough or reservoir 193 in the upper frame member 35. The trough 193 has drain holes 194 from which oil falls onto the gears 170, 179, and bracket cup 185b, each of which is constructed to hold oil on its upper face which is fed to the gearing bearings through passages 195. The run-off and splash oil in the gear casing is relied upon to lubricate the gear teeth.

Water is supplied to the machine through two solenoid thermostatic mixing valves 196, 197 (Figs. 1 and 2) having fittings 198, 199 for connection with the hot and cold water supply lines. The valve 196 is adjusted to supply hot, and the valve 197 is adjusted to supply tepid, water. When both valves are operating, water of an intermediate temperature is supplied. The temperature of the water may be controlled by suitable switch means, not shown manually adjustable to energize either or both of the solenoids 196a, 197a for the valves 196, 197 to obtain tepid, hot, or intermediate temperature water. The tepid water valve 197 has a discharge conduit 201 (Fig. 1) terminating in a nozzle 201a directing a stream against a splash ring or flange 202 projecting inwardly from the outer casing 1 slightly below the bottom of the spinner basket. The spattering at the desired time breaks up any soap suds which may accumulate during washing and reduces the friction drag during drying which in extreme cases might be enough to keep the basket from coming up to speed. The hot water valve has a discharge conduit 203 leading to a soap box 204 having a discharge nozzle 205 directed to the space between the tank wall and the spinner basket. This soap box may be similar to that disclosed in my application Serial No. 551,097, filed August 25, 1944. The soap box is arranged to receive granular or flake soap which is flushed out of the soap box by the water and falls into the bottom of the outer casing. The soap is thoroughly mixed or dissolved in the circulating pump 20 as the water is pumped from the bottom of the outer casing into the spinner basket. The hot water is led into the soap box through a tangential inlet 206 so as to set up a vertical motion of the water which thoroughly washes the side walls of the soap box. The soap box discharge nozzle 205, which is open at all times, projects outward a sufficient distance so that dry soap will not fall out due to the natural angle of repose of the soap. Water for washing and rinsing is pumped up to the spinner basket 2 by the circulating pump 20 and drips through the filter 21, gradually reaching the clothes in the basket and preventing ballooning (trapping of air beneath folds of wetted clothes) which is accentuated by the discharge of high velocity streams into the basket.

The water is shut off by a float 211 (Fig. 4) responsive to the accumulation of water in the bottom of the outer casing which, when the basket is filled to overflowing and a small amount of water accumulates in the casing, opens a switch 212 in series with the solenoid valves 196, 197. Float 211 may actuate additional switches if desired, it being shown in the present instance as actuating switches 213 and 246 which may be switches of a control system for the machine such as that disclosed and claimed in my divisional application Serial No. 639,816, filed January 8, 1946.

To prevent objectionable vibration during extracting, resilient mountings are provided which permit the basket to rotate about its center of mass and which damp the high amplitude gyrations associated with the critical speed.

In the resilient mounting shown in Figs. 1 and 2, the spinner basket and driving mechanism are supported by a plurality of coil springs 214 arranged between the under side of a flange 215 on the lower half 32 of the casing 22 and an inwardly extending flange 216 (Figs. 2 and 3) at the lower end of a cylindrical supporting member 217 supported by the bottom plate 24 of the outer casing and depending through the opening 23. The springs have a stiffness such that the critical speed is of the order of 100 R. P. M., or slightly above the water emptying speed of the spinner basket—the speed at which the free water in the basket (the water not absorbed in the clothes) is centrifugally discharged. Sufficient clearance is provided to permit a lateral movement of the casing 22 without striking the support 217 or the flanges 216. Fixed to the flanges 216 are horizontal arms 218 (Fig. 3) carrying pads of friction material 218a extending tangentially to the casing 22 between spaced vertical spring strips 219 (Fig. 1) having the upper ends pivoted in rubber sockets 220 on the flange 215 and having the lower ends urged together by springs 221. The spring strips are bowed so the spacing varies along the length of the strips. The pressure on the friction pads 218a accordingly varies with the position of the arms 218 relative to the strips. When the basket is full of water, as it will be at the start of centrifugal drying, the arms 218 are at the upper part of the springs strips 219 where the friction is greater. This greater friction is helpful in damping the large amplitude vibrations as the spinner basket goes through the critical speed. After the basket is emptied, the weight on the springs 214 is materially reduced and the arms 218 are moved to the center of the spring strips 219 where a lesser friction damping is exerted sufficient to limit the amplitude of the vibrations in the speed range from the critical speed to the normal running speed. In addition to supplying the friction damping, the spring strips 219 are laterally yieldable as a pair to permit the lateral movement of the gear casing 22 which is found to be helpful in reducing the transmitted vibration. The lateral movement of the gear casing at the location of the friction dampers 218, 219 permits lowering of the node of vibration below the spring support so that less angularity of the spinner shaft is required to permit rotation of the spinner basket about its center of mass.

In Fig. 13 is shown another form of resilient support applicable to each of the machines. In this construction the bottom plate 24 of the outer casing has an upwardly extending cylindrical pedestal 222 having an inwardly extending flange 222a at the top spaced from the gear casing 22 to which is secured a supporting member 223 having an upwardly presented spherical surface 224 carrying spherically surfaced friction material 225. A supporting member 226 bolted to the upper end of the casing 22 has a concave concentric spherical surface 227 seated on the friction material. The casing is resiliently centered in an upright position by a rubber ring 228 arranged between a flange 229 on the casing 22 and the under side of a flange 230 on the supporting member 223. The rubber ring is keyed to the flanges 229 and 230 and is under compression providing, when casing 22 is angularly displaced, the pressure between the surface 227 and the friction material 225 necessary to damp the gyratory vibration of the gear casing and spinner basket. The stiffness of the rubber ring is such that the critical speed is of the order of 100 R. P. M. and the friction damping exerted by the friction material 225 is sufficient to limit the amplitude of the gyration at the critical speed. With this construction, the basket and gear casing gyrate about the center of the spherical surfaces 224, 227 (the node of the vibration) to an extent sufficient to permit the spinner basket to rotate substantially about its center of mass, thereby minimizing the vibration due to unbalanced distribution of clothes in the basket.

What I claim as new and desire to secure by Letters Patent on the United States is:

1. In combination, a spinner basket shaft, an agitator shaft, driving mechanism having a rotatable frame for driving the spinner basket shaft, a driving shaft journaled in said frame, mechanism operated by rotation of said shaft relative to said frame for driving the agitator shaft, clutch and brake means surrounding said drive shaft and resiliently connected to said frame in spaced relation thereto for clutching the frame to the drive shaft and for braking the rotation of the frame, said means including an axially movable member and a bellows surrounding the shaft to which it is fitted, means biasing said axially movable member to the braking position, a passage for supplying fluid to the bellows to effect movement of said member from the braking position, and means controlling the supply of fluid to said passage.

2. In combination, a pair of shafts, a frame connected to one of said shafts for rotation thereof, gearing carried by said frame through which the other shaft is operated, a brake shoe fixed relative to said frame, a motor, means connecting the motor to said gearing, a clutch member fixed to said motor, a combined brake and clutch member, arm means flexibly connecting said frame and said combined brake and clutch member for movement of the latter axially relative to said brake shoe, spring means effecting a braking engagement between the brake shoe and the combined brake and clutch member and establishing a position of said latter member out of engagement with said motor clutch member, a fluid pressure actuated member for releasing said braking engagement and concomitantly effecting engagement of said motor clutch and said combined brake and clutch member, and means for supplying fluid pressure to said fluid pressure actuated member.

3. A unitary structure for actuating two shafts comprising a sealed casing, a vertical shaft motor in the casing, a frame in the casing above the motor connected to one of said shafts, an axially movable unitary brake and clutch structure yieldably affixed to said frame, said structure when in one position braking said frame and disconnecting it from the motor and in another position releasing the frame and connecting it to the motor, actuating mechanism carried by the frame through which the other of said shafts is connected to the motor, a pressure actuated member for moving the brake and clutch structure, and a pump driven by the motor for supplying fluid pressure to said pressure actuated member.

4. A unitary structure for actuating two shafts comprising a sealed casing, a vertical shaft motor in the casing, a frame in the casing above the motor connected to one of said shafts, an axially movable brake and clutch structure resiliently connected to said frame, said structure when in one position braking said frame and disconnecting it from the motor and in another position releasing the frame and connecting it to the motor, spring means biasing said structure into braking position, actuating mechanism carried by the frame through which the other of said shafts is connected to the motor, a pressure actuated member for moving the brake and clutch structure, a pump driven by the motor for supplying fluid pressure to said pressure actuated member, and an electrically operated valve controlling flow of fluid from the pump to the pressure actuated member.

5. In combination, a spinner basket shaft, an agitator shaft arranged coaxial therewith, means including a rotatable frame for driving said spinner basket shaft, a driving shaft journaled in said frame, mechanism operated by rotation of said driving shaft relative to said frame for driving the agitator shaft, a brake member concentric with respect to said frame, means for securing said brake member against rotation relative to said frame, a unitary clutch and brake means concentric with said drive shaft, arm members securing said unitary means to said frame for axial movement relative thereto, said arm members biasing said unitary clutch and brake means and said brake member releasably into engagement, a motor for said drive shaft, a fluid pump driven thereby, a clutch member coaxial with and driven by said motor for transmission of motor power to said unitary clutch and brake means, means disposed about said drive shaft and responsive to application of fluid pressure thereto for movement coaxially of said shaft for effecting a disengagement between said brake member and said unitary clutch and brake means and connection of the clutch portion of said last-named means with said motor driven clutch member, flow passage means communicating between said pump and said pressure responsive means, a by-pass from said fluid pump, and valve means for optionally by-passing pump discharge relative to said pressure responsive means or for directing said pump fluid pressure thereto.

THOMAS T. WOODSON.

REFERENCES CITED

The following references are of record in the file of this patent:

UNITED STATES PATENTS

| Number | Name | Date |
|---|---|---|
| 427,085 | Jones | May 6, 1890 |
| 1,510,943 | Kjelsberg | Oct. 7, 1924 |
| 1,518,360 | Royce | Dec. 9, 1924 |
| 1,730,270 | Friedell | Oct. 1, 1929 |

(Other references on following page)

UNITED STATES PATENTS

| Number | Name | Date |
|---|---|---|
| 1,758,370 | Olsen | May 13, 1930 |
| 1,934,109 | Wemp | Nov. 7, 1933 |
| 1,942,677 | Wood | Jan. 9, 1934 |
| 2,069,408 | Forichon | Feb. 2, 1937 |
| 2,087,643 | Gillett | July 20, 1937 |
| 2,182,387 | Probst | Dec. 5, 1939 |
| 2,278,068 | Fawick | Mar. 31, 1942 |
| 2,300,421 | Henderson | Nov. 3, 1942 |
| 2,321,821 | Kateber | June 15, 1943 |
| 2,346,158 | Dyer | Apr. 11, 1944 |
| 2,346,669 | Dunhorn | Apr. 18, 1944 |
| 2,351,746 | Driehous | June 20, 1944 |

FOREIGN PATENTS

| Number | Country | Date |
|---|---|---|
| 75,484 | Switzerland | Aug. 1, 1917 |

Certificate of Correction

Patent No. 2,527,238                                                                October 24, 1950

THOMAS T. WOODSON

It is hereby certified that error appears in the printed specification of the above numbered patent requiring correction as follows:

Column 9, line 44, for the word "fitted" read *fixed*; line 47, after "said" insert *axially movable*;

and that the said Letters Patent should be read as corrected above, so that the same may conform to the record of the case in the Patent Office.

Signed and sealed this 20th day of March, A. D. 1951.

[SEAL]

THOMAS F. MURPHY,
*Assistant Commissioner of Patents.*